United States Patent [19]
Powers, Jr. et al.

[11] 3,842,251
[45] Oct. 15, 1974

[54] RADAR DATA MAP CORRELATOR
[75] Inventors: Joseph William Powers, Jr., Los Angeles; George H. Towner, Palos Verdes Peninsula, both of Calif.
[73] Assignee: Northrop Corporation, Los Angeles, Calif.
[22] Filed: Oct. 10, 1972
[21] Appl. No.: 296,042

[52] U.S. Cl................ 235/181, 315/11, 324/77 K, 343/100 CL
[51] Int. Cl......................... G06g 9/00, H01j 29/06
[58] Field of Search......... 235/181; 315/10, 11, 8.5, 315/8.6; 313/70, 71, 72, 83, 86; 343/5 MM, 5 CM, 7.7; 328/123-126

[56] References Cited
UNITED STATES PATENTS

| 2,753,552 | 7/1956 | Hom | 343/5 CM |
| 3,102,260 | 8/1963 | Mihelich | 343/5 MM |
| 3,360,680 | 12/1967 | Plaistowe | 328/123 X |
| 3,388,395 | 6/1968 | Gumphrey et al. | 343/5 MM |
| 3,553,690 | 1/1971 | Spangler | 343/5 MM |

FOREIGN PATENTS OR APPLICATIONS

| 247,639 | 7/1969 | U.S.S.R. | 328/123 |

OTHER PUBLICATIONS
Brown et al.: An Introduction to Synthetic Aperture Radar IEEE Spectrum, Sept. 1969, pp. 52–62.

Primary Examiner—Felix D. Gruber
Attorney, Agent, or Firm—Edward A. Sokolski

[57] ABSTRACT

The phase or "chirped" video return of a synthetic aperture radar which carries two-dimensional information of target positions is modulated onto the "write" beam of a storage tube. The "read" beam of this storage tube has modulated thereon an image in the form of a holographic pattern representing an elemental unit of the two-dimensional target signals. This modulation image is formed by means of an electron mask placed between the electron gun of the read section of the tube and the screen of the tube. When the read beam is swept over the storage tube screen, an output signal is generated from this screen whenever the holographic image representing an elemental target unit matches or correlates with an actual such elemental target unit stored on the screen. This signal output is appropriately fed to a cathode ray tube for immediate display or to a recorder for future utilization.

6 Claims, 5 Drawing Figures

RADAR DATA MAP CORRELATOR

This invention relates to radar data mapping and more particularly to a device for forming real time map images from the two-dimensional video output of a synthetic aperture radar.

Synthetic aperture radars have in recent years come into use for radar data mapping in aerial reconnaissance applications. The synthetic aperture radar return signal is a phased or "chirped" signal which carries two-dimensional information on the mapping targets being scanned. The radar signals are processed by means of a coherent optical system which develops holographic images of the signals, these being recorded on film for subsequent correlation and analysis. A system of this type is described, for example, in an article entitled *Optical Processing Techniques for Simultaneous Pulse Compression Beam Sharpening by Emmett N. Leith*, published in the IEEE Transactions on Aerospace and Electronic Systems for November 1968 starting on page 879 thereof. Prior art techniques have the shortcoming of not providing real time images of the targets which could be used by both the airborne personnel and for transmission to the ground. Such real time display of this information would provide an opportunity for immediate analysis and evaluation of the ground areas being surveilled and thus enable more effective reconnaissance.

The device and technique of this invention enables the immediate display of a radar data map as it is being made without in any way interfering with the recording of this information for future utilization. This end result is achieved in a relatively simple implementation which does not involve complicated, highly expensive or bulky components.

It is therefore an object of this invention to provide means for generating real time radar map signals from a synthetic aperture radar.

It is another object of this invention to improve the information output of a synthetic aperture radar.

It is still a further object of this invention to provide a correlator for correlating the output of a synthetic aperture radar so as to provide an immediate map display of such output.

Other objects of this invention will become apparent as the description proceeds in connection with the accompanying drawings of which:

FIG. 4 is a view illustrating an illustrative pattern written on the screen of the preferred embodiment, and FIG. 5 illustrates the cathode ray tube display or recorded display for the signal of FIG. 4.

Briefly described, the device and technique of the invention involves the modulation of the "write" beam of a storage tube with the video output signal of a synthetic aperture radar, this signal carrying two-dimensional information and being in the nature of a hologram. The "read" beam of this storage tube is modulated by an elemental holographic image corresponding to an elemental unit or bit of the video return of the radar. This end result is achieved by means of an electron mask which is placed between the read gun of the storage tube and the storage tube screen. The video output of this synthetic aperture radar for each scanning field is first stored on the storage tube screen. Then, the screen is scanned by the read beam which has superposed thereon the holographic image of the mask. Wherever on the screen the read beam image corresponds or correlates with an image stored on the screen, a pulse or "blip" of energy is generated, this energy appearing at the output electrode of the storage tube. The output of the storage tube is fed to a cathode ray tube, the scanning of which is synchronized with that of the storage tube, or to other display means to provide an immediate map display of the area scanned by the radar. This output may also be fed to a recorder for immediate or subsequent playback.

Figure 1:
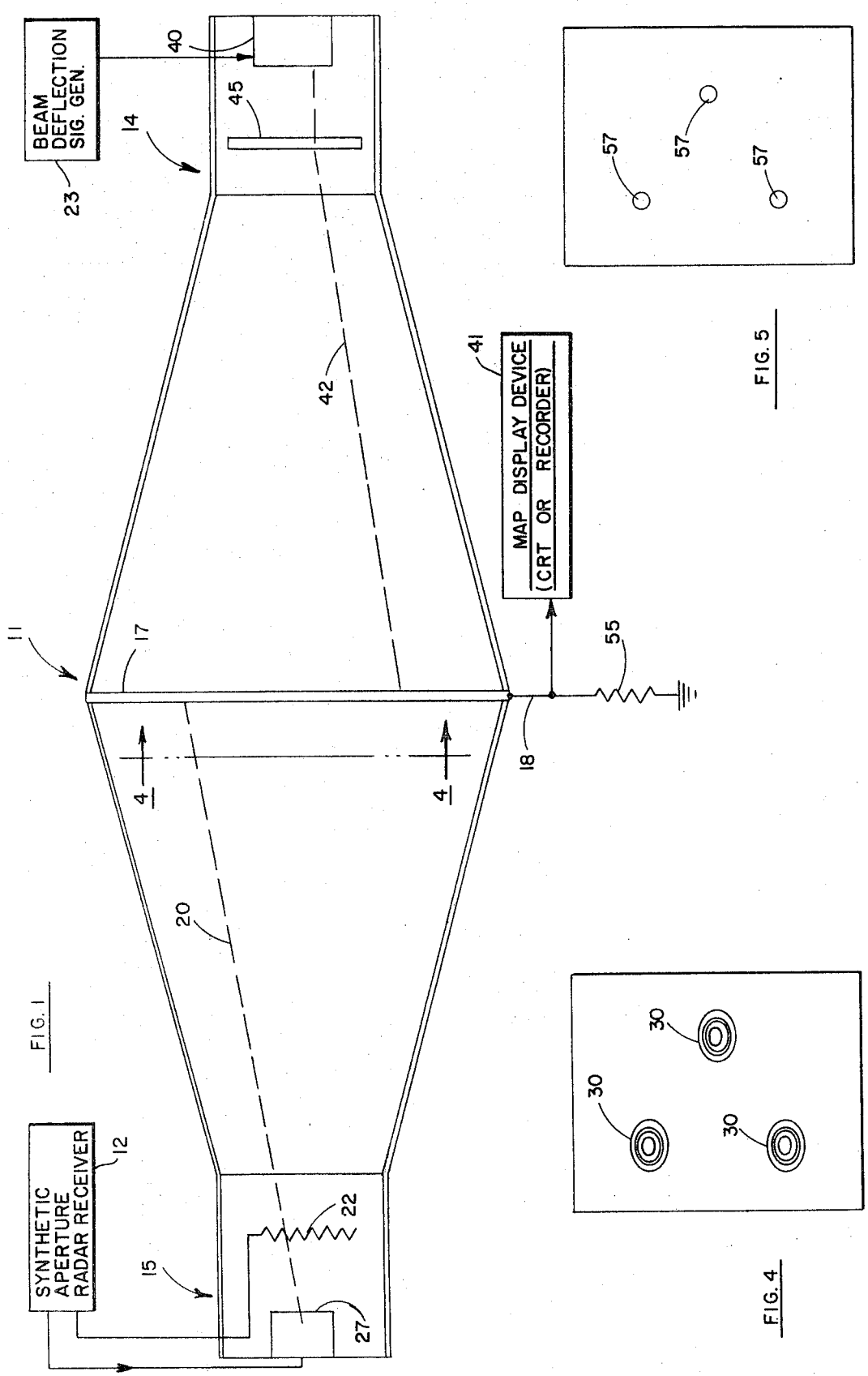
FIG. 1 is a schematic drawing illustrating one embodiment of the invention.
Figure 2:
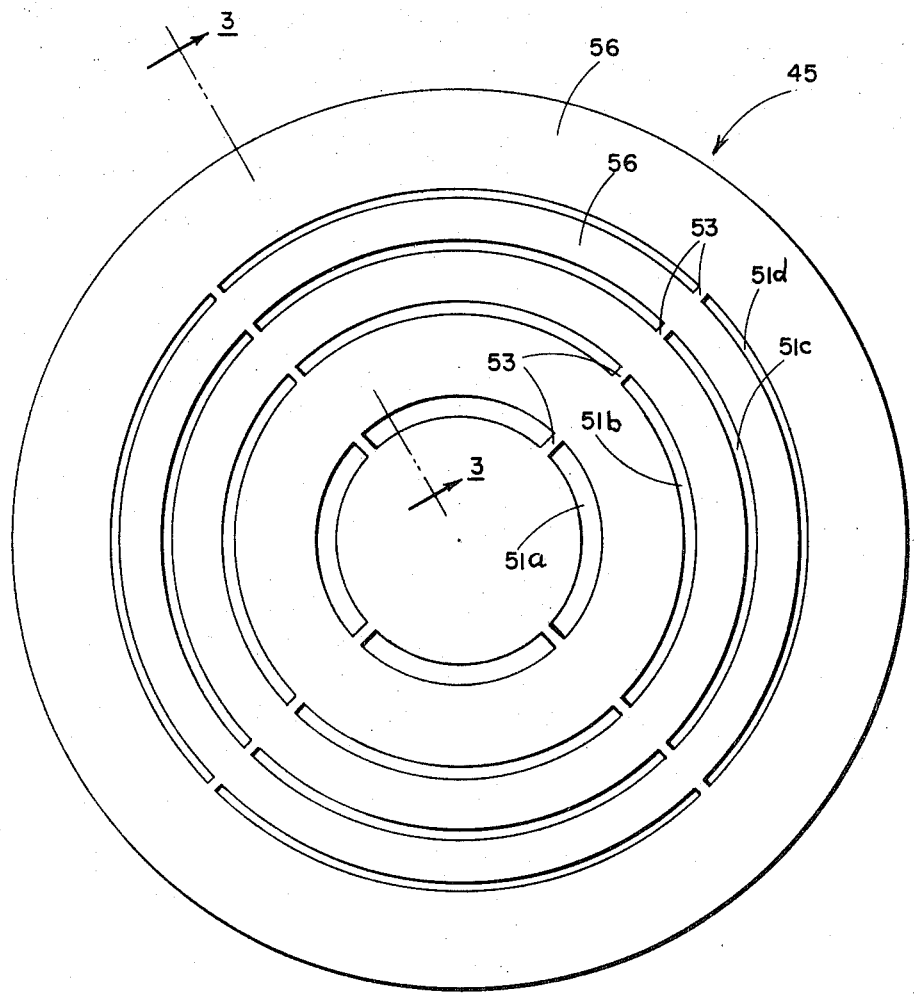
FIG. 2 is a plan view illustrating a mask element which may be utilized in the preferred embodiment.
Figure 3:
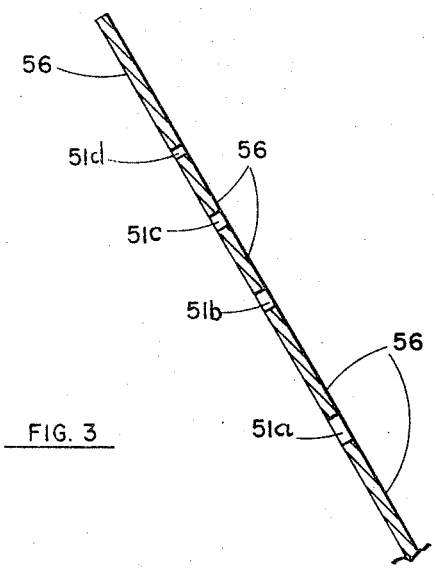
FIG. 3 is a cross sectional view taken along the plane indicated by 3—3 in FIG. 2.

Referring now to FIGS. 1–3, one embodiment of the device of the invention is illustrated. Storage tube 11 is of the dual gun type and includes a first "read" portion 14 for generating a "read" beam, and a second "write" portion 15 for generating a "write" beam. The read and write portions 14 and 15, are positioned on opposite sides of storage screen 17. Storage tubes of this general type are available commercially and can be obtained, for example, from Warnecke Electron Tubes, Inc., Des Plaines, Ill. The electron beam 20 of the write portion 15 of the tube is modulated with the video return signals received by a synthetic aperture radar receiver 12, which are fed to the signal input grid 22. Beam 20 is accelerated from electron gun and deflector 27 towards storage mesh screen 17 of the tube by an accelerating potential (not shown) in conventional fashion. The beam is scanned to cover the entire screen by means of a scanning control signal from the radar in the usual fashion, at a scanning rate suitable to cover a predetermined field of view of the radar's sensor antenna.

The signals applied to grid 22 provide a series of pictures such as shown in FIG. 4 which are in the form of a holographic representation of the field of targets in the scanning beam of the radar antenna. These holographic pictures consist of a group of generally similar images 30 as shown in FIG. 4 which are in the form of clusters of elliptical zone plates geometrically related to an actual field of targets in the antenna beam. The successive pictures written on storage mesh 17 are stored on the mesh for a time long enough to permit read out by means of the read beam as now to be explained. It is to be noted that it has been found that the holographic target elements 30 have a characteristic form of a plurality of substantially concentric ellipsis or circles and for this reason can readily be correlated by a read-out in the manner now to be described.

The read portion 14 of the storage tube has an electron gun and deflector 40 for generating read beam 42 and causing the beam to scan, in response to a signal from beam deflection signal generator 23, this beam being accelerated towards storage mesh screen 17 by an accelerating potential (not shown). The read gun 14 is modified from its conventional form to include an electron mask 45 which modifies the beam so that it is in the characteristic form of the zone plate clusters 30 stored on the storage mesh screen. The scanning beam thus is given the form of a "spot" which matches the zone plate image of mask 45 and the stored images 30.

Referring now to FIGS. 2 and 3, the details of construction of a typical design for mask plate 45 are illustrated. The mask plate is in the form of a disk of an electrically conductive material such as nickel. The mask plate has a plurality of substantially circular concentric slots 51a–51d formed therethrough there being spacer portions 53 for joining metallic sections 56 together. The unit may be formed by metal etching techniques with the spacer portions 53 being an integral portion of the original plate in which the slots 51 are etched. For a typical design, mask 45 may have a thickness of 0.005 inches and an outer diameter of 0.625 inches; slots 51a–51d being located at radii of 0.072, 0.156, 0.20 and 0.237 inches from the center of the mask, respectively. The slots 51a–51d are successively narrower in width, going from the center of the mask to its periphery, having widths of 0.012, 0.010, 0.008 and 0.006 inches for slots 51a-51d respectively. To facilitate fabrication, the mask is made with circular slots. These slots could, however, also be ellipitical in form, the only requirement being that the pattern of the mask approximate that of the characteristic pattern of the holographic images 30, received by the radar.

When read beam 42, having a scanning spot with the characteristic shape of an elemental target unit of the radar video, is scanned over the storage mesh screen 17, an output signal is generated at output electrode 18 of the storage mesh screen whenever there is a matching or correlation between the beam spot and images stored on the screen. Thus, a series of output pulses or "blips" are produced at output electrode 18 which correspond to the points in the scan where the scanning beam matches the image stored on the storage mesh screen. Thus, when the output signals, which appear across resistor 55, are fed to map display device 41 which may comprise a cathode ray tube or a recorder, a correlated video display having video elements 57 in viewable form is produced.

It is to be noted that the invention could also be implemented by placing mask plate 45 in the "write" section of the storage tube between grid 22 and screen 17 or masks could be used in both the "read" and "write" sections each containing a portion of the total image thus dividing the correlating function and enabling greater precision of operation.

Thus, the device of the invention effectively converts a hologram pixel to a map pixel by implementing a Fourier transformation by means of mask 45, to enable real time viewing of the holographic images received by the radar.

While the device of the invention has been described and illustrated in detail, it is to be clearly understood that this is intended by way of illustration and example only and is not to be taken by way of limitation, the spirit and the scope of this invention being limited only by the terms of the following claims.

We claim:

1. A correlator device for converting holographic video signals to a form useful for a map type display comprising:
    an electron storage screen,
    means for directing an electron beam for use in writing signals onto said storage screen,
    means for scanning said storage screen with an electron beam for use in reading signals stored thereon,
    means for modulating one of said beams with holographic video signals,
    electron mask means for modulating at least one of said beams in accordance with an image corresponding to an elemental video unit of the holographic video signals, said mask means being positioned in the path of said one of said beams, and
    means connected to said screen for providing an output signal when the image corresponding to the elemental video unit corresponds to an image in accordance with said holographic video signals.

2. The device of claim 1 wherein one of said modulating means modulates said writing beam and the other of said modulating means modulates said reading beam.

3. The device of claim 2 wherein said means for modulating said reading beam comprises an electron mask having slots formed therein for passing electrons therethrough, said slots being arranged in a pattern corresponding to that of the holographic elemental video unit.

4. The device of claim 3 wherein said slots are in the form of a plurality of substantially concentric circles.

5. The device of claim 4 wherein said slots have increasingly narrower widths in accordance with their distances from the center of said mask.

6. The device of claim 1 wherein said holographic video signals comprise the output of a synthetic aperture radar.

* * * * *